United States Patent [19]

Watanabe

[11] Patent Number: 5,246,792
[45] Date of Patent: Sep. 21, 1993

[54] STRUCTURE OF ION EXCHANGE MEMBRANE

[75] Inventor: Masahiro Watanabe, Yamanashi, Japan

[73] Assignees: Tanaka Kikinzoku Kogyo K.K., Tokyo; Masahiro Watanabe, Yamanashi, both of Japan; Stonehart Associates Inc., Madison, Conn.

[21] Appl. No.: 944,651

[22] Filed: Sep. 14, 1992

[30] Foreign Application Priority Data

Sep. 13, 1991 [JP] Japan .................................. 3-262786

[51] Int. Cl.$^5$ ............................................. H01M 2/14
[52] U.S. Cl. .......................................... 429/33; 429/42
[58] Field of Search .................. 429/30, 33, 40, 41, 429/42; 204/296, 301, 282; 521/27

[56] References Cited

U.S. PATENT DOCUMENTS

| | | | |
|---|---|---|---|
| 3,134,697 | 5/1964 | Niedrach | 429/40 X |
| 3,297,484 | 1/1967 | Niedrach | 429/41 |
| 3,432,355 | 3/1969 | Niedrach et al. | 429/42 |
| 4,328,086 | 5/1982 | Takenaka et al. | 429/41 X |
| 4,478,917 | 10/1984 | Fujita et al. | 429/33 |
| 5,176,966 | 1/1993 | Epp et al. | 429/42 X |

*Primary Examiner*—Anthony Skapars
*Attorney, Agent, or Firm*—Sughure, Mion, Zinn, Macpeak & Seas

[57] ABSTRACT

Disclosed herein are a structure of an ion exchange membrane comprising the ion exchange membrane and at least one ion-conductive thin layer having a lower glass transition temperature than that of the ion exchange membrane on at least one surface of the membrane.

According to the present invention, an electrochemical cell can be formed of which an ion exchange membrane and electrodes may be sufficiently bonded to maximize the cell performance.

3 Claims, 3 Drawing Sheets

STRUCTURE OF ION EXCHANGE MEMBRANE

BACKGROUND OF THE INVENTION

The present invention relates to a structure of an ion exchange membrane employed for such an electrochemical cell as a fuel cell.

Heretofore, the bonding between the ion exchange membrane and the electrodes of a fuel cell has been thermally conducted by means of pressing or rolling under pressure (U.S. Pat. Nos. 3,134,697, 3,297,484 and 3,432,355).

When the bonding temperature is lower than the glass transition temperature of the ion exchange membrane, the sufficient bonding strength cannot be obtained. On the other hand, when the temperature is higher than the glass transition temperature, the sufficient bonding strength can be obtained, but the ion exchange membrane frequently encroaches into the electrode too deeply under wet conditions so that it may increase active carbon area.

SUMMARY OF THE INVENTION

An object of the present invention is to provide a structure of an ion exchange membrane which increases the catalyst utilization in the electrode, especially employed in such an electrochemical cell as a fuel cell. This can be achieved with the intimate bonding structure between the membrane and the catalyst electrode, minimizing the depth of the ion exchange membrane encroaching into the catalyst electrode structure.

Another object of the invention is to provide the structure of an ion exchange membrane which can be bonded with the electrode with sufficient and uniform strength.

The present invention has been made to overcome the above-mentioned drawbacks of the prior art. These objects can be attained by means of the present invention which is a structure of an ion exchange membrane comprising the ion exchange membrane and at least one ion-conductive thin layer having a lower glass transition temperature than that of the ion exchange membrane on at least one surface of the membrane.

DETAILED DESCRIPTION OF THE INVENTION

The structure of an ion exchange membrane of the present invention can be utilized in any electrochemical cell such as a fuel cell and an electrolytic cell which may include an ion exchange membrane and two electrodes.

The ion exchange membrane is usually composed of synthetic resin and its glass transition temperature usually ranges from 120° C. to 200° C. As mentioned earlier, the hot-pressing between the membrane and the electrodes over this temperature results in the excessive wet encroachment of the membrane into the electrode layer to hinder an electrode reaction while the hot-pressing below the above temperature cannot provide sufficient bonding strength.

According to the present invention, in order to overcome these disadvantages, the thin layer having a lower glass transition temperature than that of the ion exchange membrane is formed on both of or either of the surfaces of the ion exchange membrane. When this ion exchange membrane is hot-pressed with the electrodes, the thin layer is softened by means of heat to be bonded with the electrodes. The thickness of the thin layer itself is thin so that the degree of the wet encroachment is too small to decrease the catalyst reaction area while the ion exchange membrane of which a glass transition temperature is higher is not softened to maintain its rigidity. In order to attain this performance, the thickness of the thin layer may be 0.01 to 20 μm. The sufficient bonding strength cannot be obtained below 0.01 μm while the excessive wet encroachment may be produced over 20 μm.

As it may be easily recognized, the hot-pressing is desirably conducted at a temperature between the two glass transition temperatures of the ion exchange membrane and the thin layer. The difference between the two glass transition temperatures may be preferably more than 20° C.

The thin layer may be formed by any material provided that the material possesses ion conductivity. If, for example, the ion exchange resin is formed by fluorine-containing resin such as Nafion (products of Du Pont), the thin layer may be formed by applying a mixed solution of a Nafion solution and an organic solvent of which a boiling point is preferably between 100° to 180° C. on the ion exchange membrane and evaporating the solvent. However, the material is not necessarily the same as or similar to the material of the ion exchange membrane.

Figure 1:
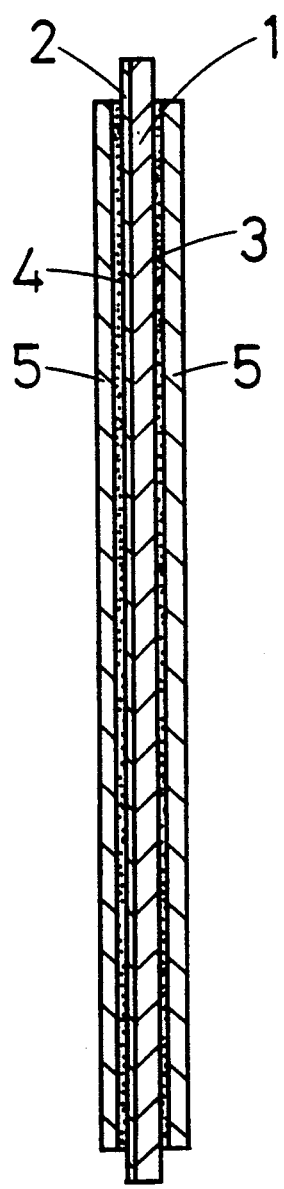
FIG. 1 is a schematic cross sectional view according to one embodiment of the structure of an ion exchange membrane of the present invention.

As shown in FIG. 1, on one surface of an ion exchange membrane 1 composed of fluorine-containing resin is formed a thin layer 2 having a lower glass transition temperature than that of the membrane 1. A cathode layer 3 and an anode layer 4 are attached on the other surface of the membrane 1 and on the thin layer 2, respectively. Two current collectors 5 are formed on the two layers 3 and 4 to constitute an electrochemical cell. When the cell is assembled by means of hot-pressing, the thin layer 2 having the lower glass transition temperature is softened to slightly encroach into the anode layer 4 to provide sufficient bonding therebetween without substantially no harmful influence to an electrode reaction.

EXAMPLE

A preferred Example of this invention will be hereinafter described. However, the Example does not intend to restrict the present invention.

Example

A mixed solution was prepared by mixing a commercially available Nafion solution (Aldrich Chemical Company, Inc.) and cyclohexanol (boiling point: 161° C.) to dissolve and disperse the Nafion therein. Then, after the viscosity of the mixed solution was adjusted to 3000 cpoise by means of the evaporation of the cyclohexanol at 100° C., the solution was applied to one surface of a Nafion film (ion exchange membrane of Du Pont) having a thickness of 200 μm to form an electroconductive thin layer having a thickness of 5 μm and a lower glass transition temperature than that of the Nafion film.

Figure 2:
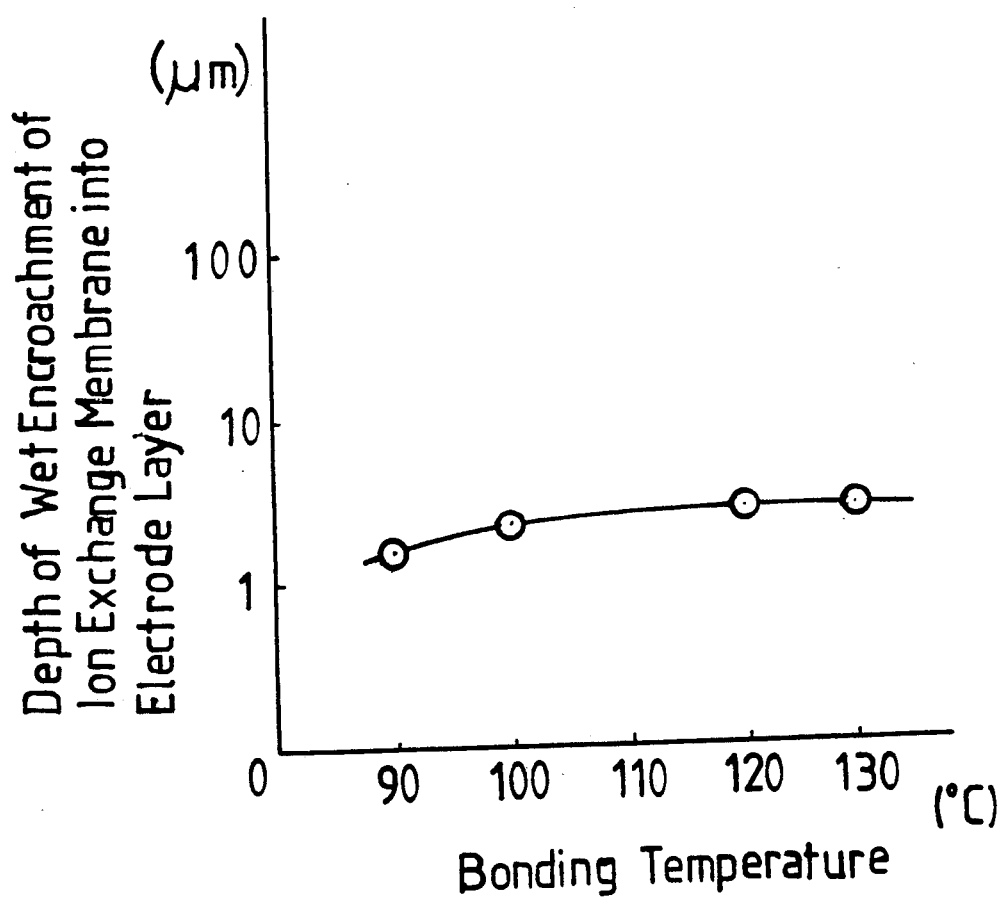
FIG. 2 is a graph showing a relation between depth of encroachment of the ion exchange membrane into an electrode layer and a bonding temperature when the ion exchange membrane and the electrode of Example of the present invention are bonded under pressure.

A catalyst electrode layer having a thickness of 50 μm was prepared by loading 30% in weight of a platinum catalyst on carbon black so as to attain 0.5 mg-Pt/cm$^2$. This catalyst electrode layer and a current collector electrode having a thickness of 200 μm were superposed on the thin layer side of the ion exchange membrane and bonded with each other by means of hot-pressing at 50 kg/cm$^2$ and at temperatures of 90° C., 100° C., 120° C. and 130° C., respectively. The depth of the ion exchange membrane into the catalyst electrode layer in the wet condition of the respective temperatures was as shown in a graph of FIG. 2. The depth thereof in all the temperatures could be maintained minimum in several μm and the bonding strength with the catalyst electrode layer was sufficient and uniform on the whole surface.

Comparative Example

Figure 3:
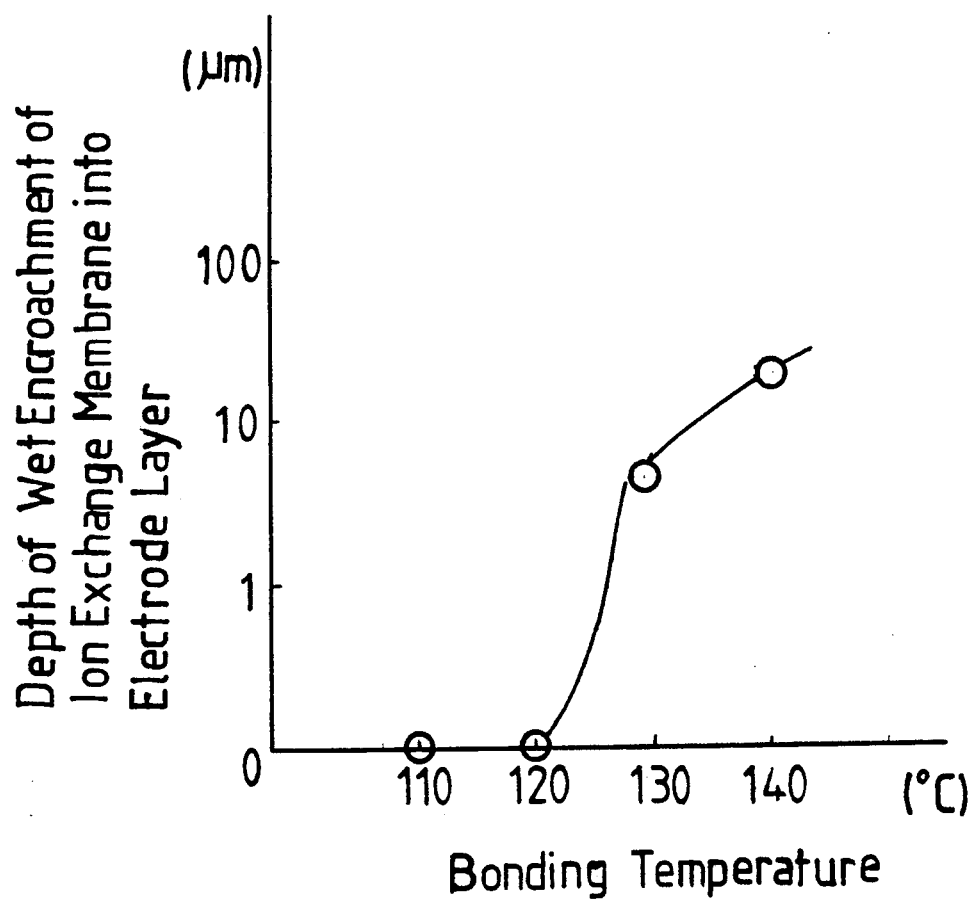
FIG. 3 is a graph showing a relation between depth of encroachment of the ion exchange membrane into an electrode layer and a bonding temperature when the ion exchange membrane and the electrode of Comparative Example are bonded under pressure.

The catalyst electrode layer and the current collector electrode of Example were superposed on the ion exchange membrane without the application of the mixed solution and bonded with each other by means of hot-pressing at 50 kg/cm$^2$ and at temperatures of 110° C., 120° C., 130° C., and 140° C., respectively. The depth of the ion exchange membrane into the catalyst electrode in the wet condition of the respective temperatures was as shown in a graph of FIG. 3. No wet encroachment could not be found in the ion exchange membranes hot-pressed at 110° C. and 120° C. so that these ion exchange membranes could not be bonded with the electrodes. On the other hand, the ion exchange membranes hot-pressed at 130° C. and 140° C. encroached into the electrode layers too deeply. Although, accordingly, the bonding strength with the electrodes was sufficient, the ion exchange membranes hindered the electrode reaction.

What is claimed is:

1. A structure of an ion exchange membrane comprising the ion exchange membrane and at least one ion-conductive thin layer having a lower glass transition temperature than that of the ion exchange membrane on at least one surface of the membrane.

2. The structure as claimed in claim 1, wherein the thickness of the thin layer is between 0.01 to 20 μm.

3. The structure as claimed in claim 1, wherein the ion exchange membrane is used in a fuel cell.

* * * * *

UNITED STATES PATENT AND TRADEMARK OFFICE
CERTIFICATE OF CORRECTION

PATENT NO. : 5,246,792

DATED : September 21, 1993

INVENTOR(S) : Masahiro Watanabe

It is certified that error appears in the above-identified patent and that said Letters Patent is hereby corrected as shown below:

Column 4, line 24, (line 2 of claim 2) delete "between".

Signed and Sealed this

Seventeenth Day of May, 1994

Attest:

BRUCE LEHMAN

Attesting Officer

Commissioner of Patents and Trademarks